(12) United States Patent
McDowell

(10) Patent No.: US 11,266,204 B2
(45) Date of Patent: Mar. 8, 2022

(54) THERMOPLASTIC POLYURETHANE INFUSED MESH

(71) Applicant: Converse Inc., Boston, MA (US)

(72) Inventor: Sean M McDowell, Andover, MA (US)

(73) Assignee: CONVERSE INC., Boston, MA (US)

(*) Notice: Subject to any disclaimer, the term of this patent is extended or adjusted under 35 U.S.C. 154(b) by 257 days.

(21) Appl. No.: 15/405,845

(22) Filed: Jan. 13, 2017

(65) Prior Publication Data

US 2017/0119102 A1 May 4, 2017

Related U.S. Application Data

(62) Division of application No. 12/965,523, filed on Dec. 10, 2010, now Pat. No. 9,573,331.

(51) Int. Cl.
*A43B 23/02* (2006.01)
*B29C 35/00* (2006.01)
(Continued)

(52) U.S. Cl.
CPC ........ *A43B 23/0215* (2013.01); *A43B 1/0009* (2013.01); *A43B 3/0078* (2013.01);
(Continued)

(58) Field of Classification Search
CPC . A43B 23/0215; A43B 1/0009; A43B 23/026; A43B 23/0265; A43B 23/0255;
(Continued)

(56) References Cited

U.S. PATENT DOCUMENTS 387,119 A * 7/1888 Stevents .................. A43B 7/20
36/89
522,371 A * 7/1894 Horn ....................... A43B 7/20
36/89
(Continued)

FOREIGN PATENT DOCUMENTS

| CN | 101225610 A | 7/2008 |
|---|---|---|
| EP | 2910141 A1 | 8/2015 |
| WO | 2010037032 A1 | 4/2010 |

OTHER PUBLICATIONS

"Submerge." in: Merriam-Webster.com [online], [retrieved on Jun. 11, 2015]. Retrieved from the Internet <URL: http://www/merriam-webster.com/dictionary/submerge>.
(Continued)

*Primary Examiner* — Katharine G Kane
(74) *Attorney, Agent, or Firm* — Shook Hardy & Bacon, LLP

(57) ABSTRACT

Embodiments of the present invention relate to a thermoplastic polyurethane ("TPU") infused mesh material that is molded to form at least a portion of a shoe. The TPU infused mesh may be formed as an upper, a portion of sole or other components of a shoe. The TPU infused mesh is formed, in an exemplary embodiment, through the application of liquid TPU to a surface of a spacer mesh. The liquid TPU infused spacer mesh is then cured, cut to a pattern, and heat molded to form a desired portion of the shoe. The heat molded TPU mesh is coupled to other portions of the shoe (e.g., sole) to form an article footwear in an exemplary embodiment.

17 Claims, 5 Drawing Sheets

(51) Int. Cl.
| | |
|---|---|
| *B29D 35/14* | (2010.01) |
| *B29C 70/42* | (2006.01) |
| *A43B 3/00* | (2022.01) |
| *A43B 1/00* | (2006.01) |
| *B29C 35/02* | (2006.01) |
| *B29C 51/00* | (2006.01) |
| *B29D 35/12* | (2010.01) |
| B29K 75/00 | (2006.01) |
| B29K 105/20 | (2006.01) |
| B29L 31/50 | (2006.01) |

(52) U.S. Cl.
CPC .......... *A43B 23/025* (2013.01); *A43B 23/026* (2013.01); *A43B 23/0255* (2013.01); *A43B 23/0265* (2013.01); *B29C 35/02* (2013.01); *B29C 51/002* (2013.01); *B29C 70/42* (2013.01); *B29D 35/126* (2013.01); *B29D 35/146* (2013.01); B29K 2075/00 (2013.01); B29K 2105/206 (2013.01); B29L 2031/50 (2013.01)

(58) Field of Classification Search
CPC ....... A43B 23/025; A43B 3/0078; A43B 7/20; B29C 35/02; B29C 51/002; B29D 35/146; B29K 2105/206; B29K 2075/00; B29K 2031/50
See application file for complete search history.

(56) References Cited

U.S. PATENT DOCUMENTS

| | | | | |
|---|---|---|---|---|
| 2,133,346 | A | 10/1938 | Diller et al. | |
| 3,824,142 | A * | 7/1974 | Healy et al. | D04H 1/46 156/148 |
| 4,726,126 | A * | 2/1988 | Bernhard | A43B 3/0031 36/89 |
| 4,785,558 | A * | 11/1988 | Shiomura | A43B 1/04 36/114 |
| 4,858,339 | A * | 8/1989 | Hayafuchi | A43B 1/04 36/45 |
| 6,079,128 | A * | 6/2000 | Hoshizaki | A43B 23/16 36/115 |
| 6,237,251 | B1* | 5/2001 | Litchfield | A43B 1/0072 36/114 |
| 6,401,364 | B1* | 6/2002 | Burt | A43B 1/00 36/3 A |
| 7,047,668 | B2* | 5/2006 | Burris | A43B 5/02 36/133 |
| 7,793,434 | B2* | 9/2010 | Sokolowski | A43B 23/0235 12/146 C |
| 7,793,435 | B1 | 9/2010 | Ruth | |
| 8,161,665 | B2* | 4/2012 | Nakano | A43B 23/07 36/55 |
| 8,747,593 | B2* | 6/2014 | Chao | A43B 13/18 156/145 |
| 8,789,295 | B2* | 7/2014 | Burch | A43B 23/0245 12/146 C |
| 8,800,172 | B2* | 8/2014 | Dua | A43B 23/0235 36/50.1 |
| 9,573,331 | B2* | 2/2017 | McDowell | B29D 35/146 |
| 2002/0071946 | A1* | 6/2002 | Norton | A43B 5/002 428/304.4 |
| 2002/0078599 | A1* | 6/2002 | Delgorgue | A43B 7/12 36/98 |
| 2003/0024591 | A1* | 2/2003 | Tseng | D02G 3/32 139/421 |
| 2004/0111923 | A1* | 6/2004 | Brooks | A43B 23/07 36/89 |
| 2004/0213959 | A1 | 10/2004 | Chiang | |
| 2005/0016023 | A1* | 1/2005 | Burris | A43B 5/02 36/45 |
| 2005/0097658 | A1 | 5/2005 | Lyons et al. | |
| 2005/0208860 | A1* | 9/2005 | Baron | A41D 27/28 442/414 |
| 2006/0048413 | A1* | 3/2006 | Sokolowski | A43B 23/0235 36/45 |
| 2007/0022627 | A1* | 2/2007 | Sokolowski | A43B 1/04 36/3 A |
| 2009/0071036 | A1 | 3/2009 | Hooper et al. | |
| 2010/0077634 | A1* | 4/2010 | Bell | A41D 27/24 36/54 |
| 2010/0175276 | A1* | 7/2010 | Dojan | A43B 3/26 36/47 |
| 2011/0088282 | A1* | 4/2011 | Dojan | A43B 23/0235 36/45 |
| 2011/0088285 | A1 | 4/2011 | Dojan et al. | |
| 2011/0197475 | A1 | 8/2011 | Weidl et al. | |
| 2012/0144698 | A1* | 6/2012 | McDowell | B29D 35/146 36/45 |
| 2012/0297643 | A1* | 11/2012 | Shaffer | A43B 1/0027 36/83 |
| 2013/0232815 | A1* | 9/2013 | Meythaler | A43B 23/0225 36/45 |
| 2013/0260104 | A1* | 10/2013 | Dua | B32B 5/02 428/175 |
| 2013/0312284 | A1* | 11/2013 | Berend | A43B 1/0027 36/84 |
| 2014/0059886 | A1* | 3/2014 | Lyttle | A43B 1/00 36/55 |
| 2014/0196310 | A1* | 7/2014 | Beye | D04B 21/20 36/45 |
| 2014/0196315 | A1* | 7/2014 | Beye | D04B 21/20 36/84 |
| 2014/0259760 | A1* | 9/2014 | Dojan | A43B 23/026 36/45 |
| 2014/0310984 | A1* | 10/2014 | Tamm | D04B 1/102 36/84 |
| 2014/0310986 | A1* | 10/2014 | Tamm | A43B 1/00 36/84 |
| 2016/0227881 | A1* | 8/2016 | Beers | A43B 23/0265 |
| 2016/0374428 | A1* | 12/2016 | Korman | A43B 13/186 36/28 |
| 2017/0119102 | A1* | 5/2017 | McDowell | B29D 35/146 |
| 2017/0348935 | A1* | 12/2017 | Leimer | A43B 5/02 |

OTHER PUBLICATIONS

"Coat." in: Merriam-Webster.com [online], [retrieved on Oct. 31, 2014]. Retrieved from the Internet, <URL: http://www.merriam-webster.com/dictionary/coat>.

"Infiltrate." in: Merriam-Webster.com [online], [retrieved on Oct. 31, 2014]. Retrieved from the Internet, <URL: http://www.merriam-webster.com/dictionary/infiltrate>.

"Infuse." in: Merriam-Webster.com [online], [retrieved on Oct. 31, 2014]. Retrieved from the Internet, <URL: http://www.merriam-webster.com/dictionary/infuse>.

Notification of Transmittal of the International Search Report and the Written Opinion of the International Searching Authority, or the Declaration in PCT/US2011/063929, dated Mar. 27, 2012, 21 pages.

Extended Search Report dated Mar. 3, 2017 in European Patent Application No. 11847363.6, 8 pages.

European Office Action received for European Patent Application No. 11847363.6, dated Jun. 5, 2020, 6 pages.

Intention to grant received for European Patent Application No. 11847363.6, dated Apr. 7, 2021, 7 pages.

Extended European Search Report received for European Patent Application No. 21177684.4, dated Sep. 17, 2021, 7 pages.

* cited by examiner

THERMOPLASTIC POLYURETHANE INFUSED MESH

CROSS-REFERENCE TO RELATED APPLICATIONS

This application entitled "Thermoplastic Polyurethane Infused Mesh" is a divisional of U.S. application Ser. No. 12/965,523, entitled "Thermoplastic Polyurethane Infused Mesh", and filed Dec. 10, 2010. The entirety of the aforementioned application is incorporated by reference herein.

BACKGROUND

A shoe is typically constructed with a sole and an upper. The sole is traditionally formed from a resilient material, such as foam and/or rubber. The upper is traditionally formed with leather, canvas, or a polymer-based sheet material. A portion of spacer mesh may also be used in the upper of a traditional shoe to provide padding or support. A spacer mesh is a knitted synthetic product that is typically flexible and soft. However, spacer mesh has traditionally only been a supplemental material in the construction of the upper. A traditional shoe's upper exterior and main structure is typically provided by the traditional materials (e.g., leather, canvas) used to form the upper.

SUMMARY

Embodiments of the present invention relate to a thermoplastic polyurethane ("TPU") infused mesh material that is molded to form at least a portion of a shoe's upper. The TPU infused mesh is formed, in an exemplary embodiment, through the application of liquid TPU to a surface of a spacer mesh. The liquid TPU infused spacer mesh is then cured, cut to a pattern, and heat molded to form a desired portion of a shoe. The heat molded TPU mesh is coupled to other portions of the shoe (e.g., sole) to form an article footwear.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
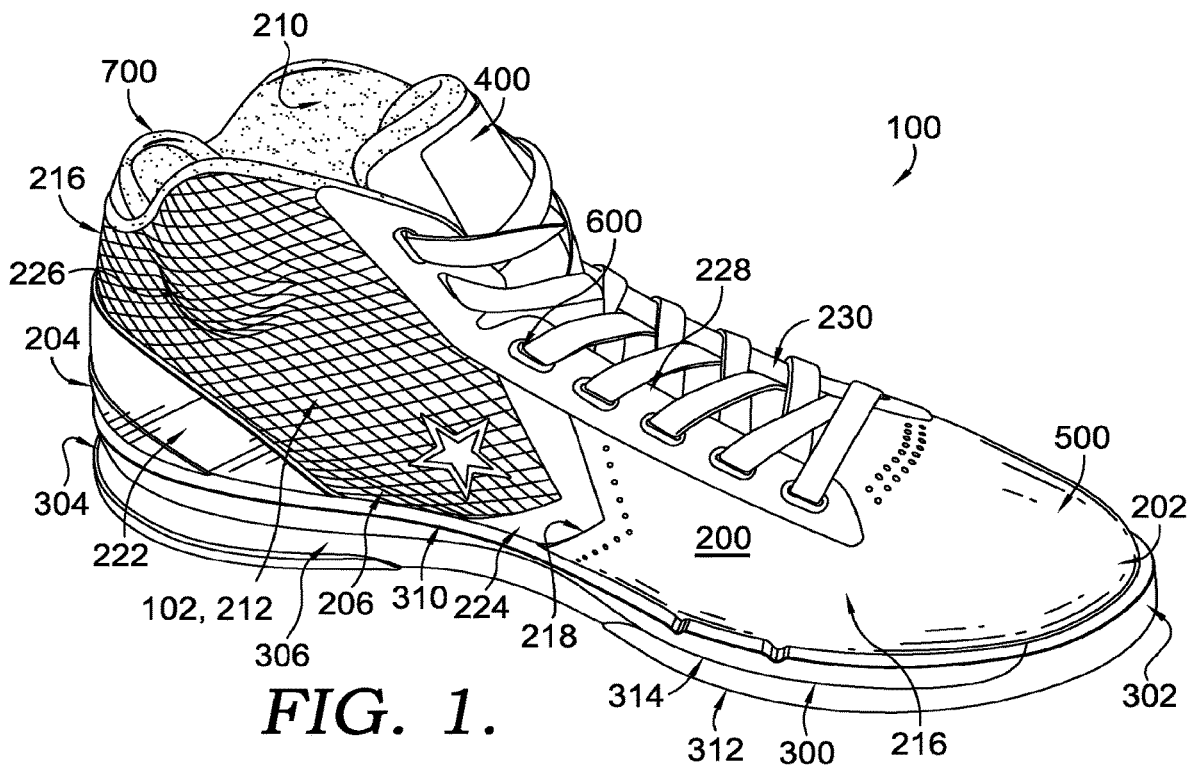
FIG. 1 depicts a medial perspective view of an exemplary shoe having a TPU infused mesh upper portion, in accordance with embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Embodiments of the present invention relate to a thermoplastic polyurethane ("TPU") infused mesh material that is molded to form at least a portion of a shoe's upper. The TPU infused mesh is formed, in an exemplary embodiment, through the application of liquid TPU to a surface of a spacer mesh. The liquid TPU infused spacer mesh is then cured, cut to a pattern, and heat molded to form a desired portion of a shoe. The heat molded TPU mesh is coupled to other portions of the shoe (e.g., sole) to form an article footwear.

Accordingly, in one aspect, the present invention provides a method of manufacturing a TPU infused material for use in construction of a shoe. The method includes applying TPU to at least one surface of a flexible material, which forms a TPU infused material. The method also includes curing the TPU infused material, which may be accomplished in an oven at an elevated temperature. The method may also include cutting the TPU infused material into a pattern useable in construction of the shoe. For example, the TPU infused material may be cut into a pattern that, when molded, forms a portion of an upper. The method also includes heat molding the pattern of the TPU infused material to form a molded portion. The heat molding process may be applied at a temperature at which the TPU reacts, but the spacer mesh remains in a solid state.

A second aspect of the present invention provides an article of footwear constructed with thermoplastic polyurethane (TPU) infused material. The article of footwear includes a sole having a toe end, a heel end, a lateral side, and a medial side. The article of footwear also includes an upper extending upwardly from the sole. An exterior surface of the upper forms at least a portion of an exterior surface of the article of footwear. Additionally, at least a portion of the upper is a TPU infused spacer mesh material.

A third aspect of the present invention provides a method of manufacturing a shoe upper with a TPU infused spacer mesh. The method includes cutting the TPU infused spacer mesh into a pattern for a portion of the shoe upper. The TPU infused spacer mesh is a knit spacer mesh infused with a cured liquid TPU. The method also includes heat molding the pattern to form the portion of the shoe upper. In an exemplary embodiment, the portion includes a heel surrounding portion of the upper. The method additionally includes coupling the heat molded portion of the shoe upper formed from the TPU infused spacer mesh to a shoe sole.

Having briefly described an overview of embodiments of the present invention, a more detailed description follows.

The construction of an exemplary article of footwear ("shoe") 100 of the present invention has the basic construction of a traditional shoe. However, the shoe 100 is constructed with an upper 200 that is comprised of a toe portion 216 and a heel portion 214. The heel portion is formed from a thermoplastic polyurethane ("TPU") infused spacer mesh ("TPU mesh"). In an exemplary embodiment, the TPU mesh is made from a spacer mesh to which a liquid TPU has been applied. The liquid TPU is cured on/in the spacer mesh. In this example, the cured TPU mesh is then cut to a pattern size and heat molded to form a portion of the upper 200. Finally, in an exemplary embodiment, the molded TPU mesh is then coupled to a sole 300 of the shoe 100.

In embodiments, the shoe 100 is a high-top basketball-style shoe. However, it should be understood that the TPU mesh could be employed on other types of shoes (e.g., low-top, infant, toddler, children, adult, cross-training, running, lifting, sandals, clogs, boots, and the like). Because much of the construction of the shoe 100 is the same as that of a conventional shoe, the conventional features of the constructions will be described only generally herein.

As is traditional with a shoe, the sole 300 is constructed from a midsole 314 and an outsole 316. Additionally, in an exemplary embedment, the sole 300 may include an insert as is also common to a shoe sole. The sole 300 has a toe end 302, an opposite heel end 304, a medial side 306, and an opposite lateral side 308. As a result, the sole 300 forms a perimeter 310 that extends around the sole 300 and includes the toe end 302, the heel end 304, the medial side 306, and the lateral side 308. The sole 300 may be constructed from a resilient material or combination of materials. For example, the midsole 314 may be formed from a foam, polymer, rubber, or the like. Similarly, the outsole 312 may be formed from similar materials.

The shoe 100 also is constructed with the upper 200. The upper 200 is secured to the sole 300 and extends upwardly from a midsole top surface. The upper 200 has a medial side portion 206 and a lateral side portion 208 that extend along the respective sole medial side 306 and the sole lateral side 308. The upper medial side portion 206 extends upwardly from the sole medial side 306 to an upper medial side edge 228. The upper lateral side portion 208 extends upwardly from the sole lateral side 308 to an upper lateral side edge 230. The upper medial side edge 228 and the upper lateral side edge 230 extend rearwardly from opposite sides of the toe end 202 of the upper 200. As is typical, a length of the upper medial side edge 228 and the upper lateral side edge 230 define a forefoot opening in the upper 200 that opens to a shoe interior.

As is typical of a shoe construction, the upper 200 may also be constructed with a toe box 500 that extends around and across a midsole top surface at the toe end 302. The toe box 500, in this exemplary embodiment, is connected between the upper medial side portion 206 and the upper lateral side portion 208 and encloses a portion of the shoe interior adjacent the sole toe end 302. The upper medial side edge 228 and the upper lateral side edge 230 may extend rearwardly from the toe box 500.

A first plurality of apertures 600 are provided on the upper medial side portion 206 and a second plurality of the apertures 600 are provided on the upper lateral side portion 208. The apertures 600 are lacing openings in an exemplary embodiment. A lacing opening is an opening that is typically occupied by a portion of a fastener, such as lacing that closes the shoe upper 200 over the forefoot opening of the shoe 100. The apertures 600 may provide any type of lacing openings on the shoe, for example, D-rings or speed lacing hooks. However, in an exemplary embodiment, the apertures 600 are an eyelet or grommet style aperture. The apertures 600 are arranged in lines along the upper medial side portion 206 and the upper lateral side portion 208, as is conventional. As illustrated in the figures, the apertures 600, in an exemplary embodiment, extend substantially the entire length of the upper medial side edge 228 and the upper lateral side edge 230.

The upper 200 may include a vamp or a throat positioned rearwardly of the toe box 500, and a tongue 400 that extends rearwardly from the vamp through the forefoot opening. The tongue 400 extends along the lengths of the upper medial side portion 206 and the upper lateral side portion 208 to a distal end of the tongue, a tongue upper edge, near an ankle opening.

Figure 6:
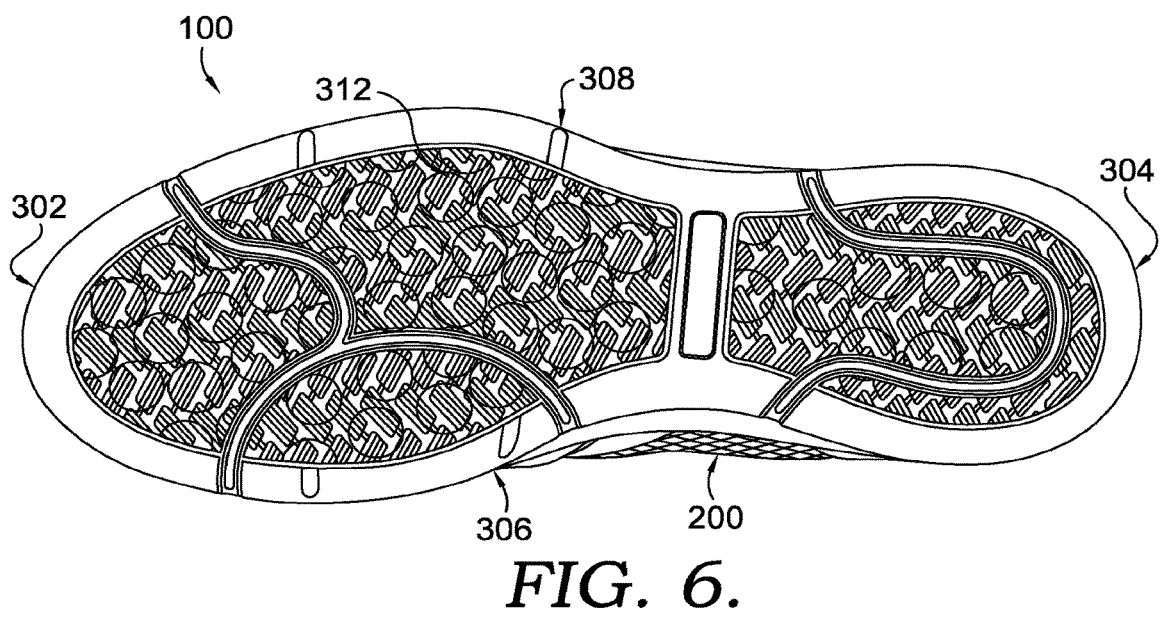
FIG. 6 depicts a bottom view of the exemplary shoe having the TPU infused mesh upper, in accordance with an embodiment of the present invention.
Figure 7:
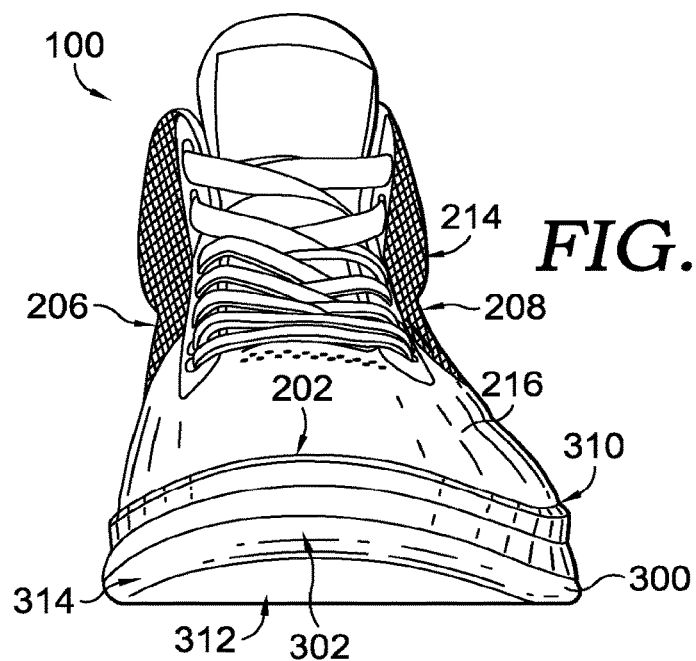
FIG. 7 depicts a toe end view of the exemplary shoe having the TPU infused mesh upper, in accordance with an embodiment of the present invention.
Figure 8:
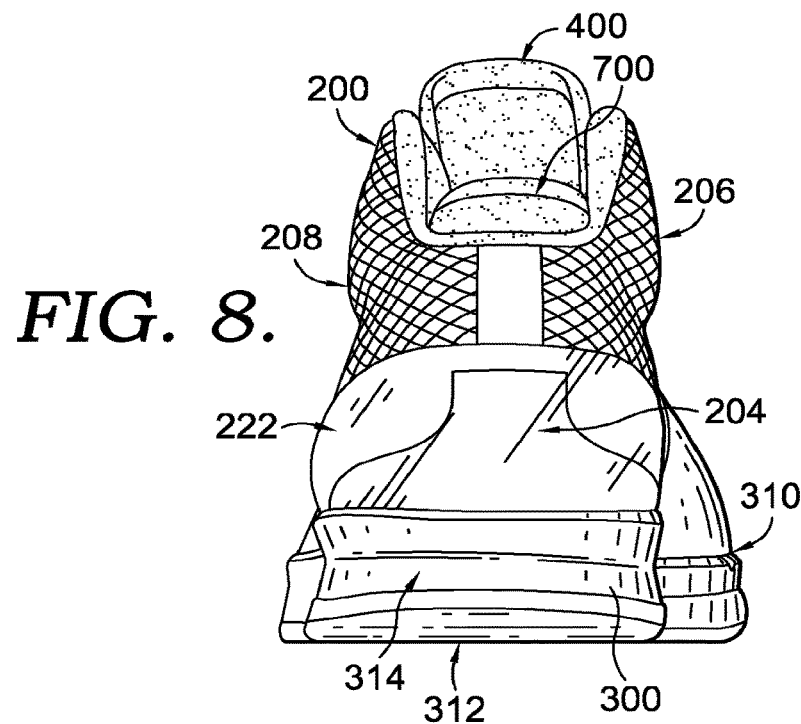
FIG. 8 depicts a heel end view of the exemplary shoe having the TPU infused mesh upper, in accordance with an embodiment of the present invention.

As is typical with a shoe, the size of the shoe 100 has a length that extends from the sole heel end 304 to the sole toe end 302. As also best seen in FIG. 6, the shoe 100 has a width that extends between the medial side 306 and the sole lateral side 308.

The upper 200 may be formed with the TPU mesh, which provides a rigid, breathable, lightweight material that is suitable for forming an upper of a shoe. Traditionally, spacer mesh, which is sometimes referred to as 3D mesh, air mesh, and/or sandwich mesh, is a flexible material that may provide padding and volume to an item. Spacer mesh is typically a knitted material formed from a synthetic fiber, such as polyester and/or nylon. In an exemplary embodiment, the spacer mesh has an exterior surface 212 and an interior surface 210. Between the interior surface 210 and the exterior surface 212, the spacer mesh includes a fibrous mass that is adjusted to vary a thickness of the spacer mesh.

The interior surface 210 and the exterior surface 212 may be a similar texture or design, such as a diamond knitted pattern illustrated in the figures. However, it is contemplated that the interior surface 210 is different than the exterior surface 212 in an exemplary embodiment. For example, to optimize airflow and/or rigidity, the interior surface 210, which may form a portion of the interior of the upper 200, may have a smaller (or larger) woven pattern than the exterior surface 212, which may form a portion of the exterior surface 102 of the shoe 100.

Additionally, it is contemplated that a thickness of the spacer mesh may be changed depending on a portion of the shoe 100 that the spacer mesh will be utilized. For example, a spacer mesh intended for use near a heel portion 214 may be thicker and therefore more rigid than a spacer mesh that may be used as part of a toe portion 216, which may require more flexibility. As will be discussed in more detail hereinafter, the thickness of the spacer mesh may be changed by selecting a different thickness of material or it may be manipulated by applying a compressive force and/or heat to the TPU mesh.

As illustrated in the figures, the upper 200 may be constructed from a combination of TPU mesh in a first location (e.g., the heel portion 214) and from traditional materials in a second location (e.g., the toe portion 216). However, it is also contemplated that the TPU mesh may be utilized to form the entirety of the upper 200, in an exemplary embodiment.

Additionally, it is contemplated that a supplement 222 may be coupled to one or more portions of the upper 200. For example, proximate the heel end 204, the supplement 222 may be coupled to the TPU mesh for additional support. In this example, the supplement 222 is a polymer-type material coupled to both the upper 200 and the sole 300 to provide additional lateral support for a heel region of a wearer's foot. The supplement 222 may complement the TPU mesh when used in conjunction to form a portion of the upper 200. For example, the TPU mesh may maintain a thinner thickness when formed as part of the upper when the supplement 222 is implemented at strategic locations that require greater structural support.

A TPU mesh portion of an upper 200 may be coupled to the sole 300 utilizing techniques common to shoe construction. Additionally, it is contemplated that the TPU mesh may be adapted to bond with the sole 300 utilizing a TPU glue. For example, because the TPU mesh is infused with TPU, the TPU mesh may be more susceptible to bonding characteristic of the TPU glue than traditional material used to form a traditional upper. However, it is contemplated, as previously discussed, that other coupling techniques may be utilized to couple the TPU mesh portion of the upper 200 to the sole 300. In an exemplary embodiment, the TPU mesh is stitched to a portion of the sole 300.

Figure 2:
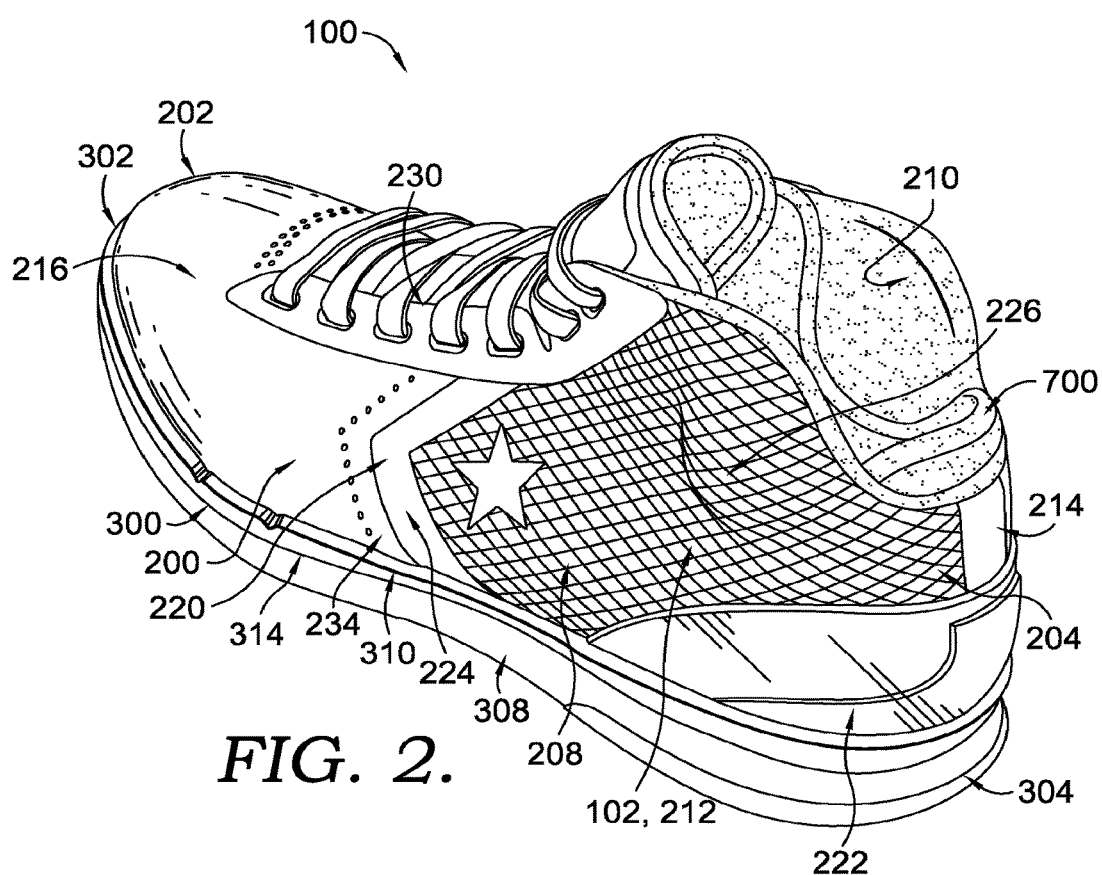
FIG. 2 depicts a lateral perspective view of the exemplary shoe having the TPU infused mesh upper, in accordance with an embodiment of the present invention.
Figure 3:
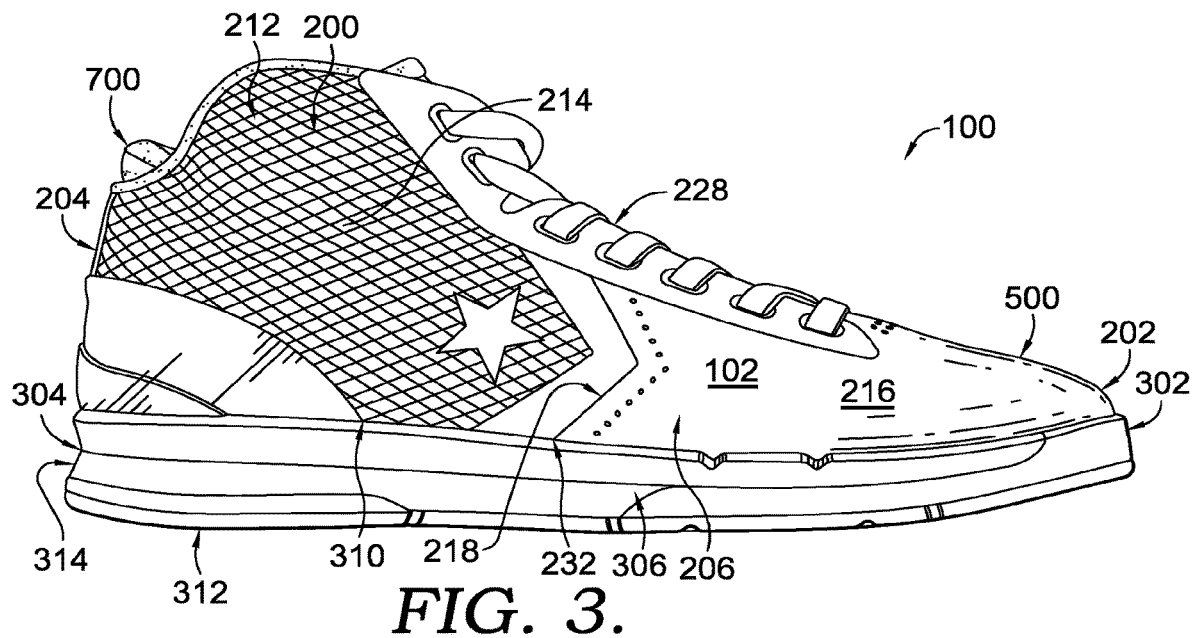
FIG. 3 depicts a medial view of the exemplary shoe having the TPU infused mesh upper, in accordance with an embodiment of the present invention.
Figure 4:
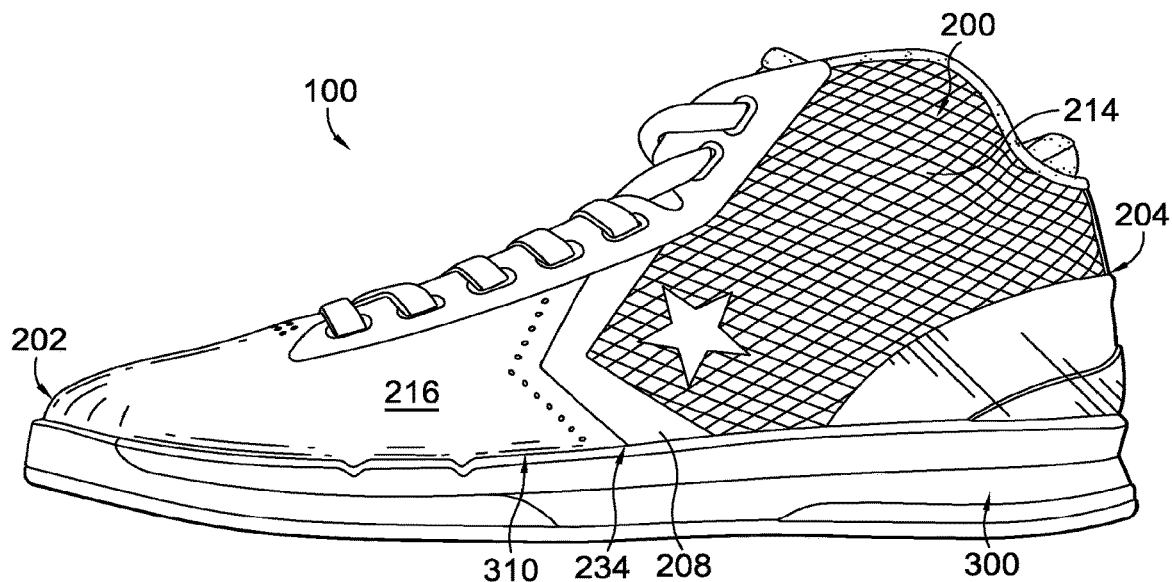
FIG. 4 depicts a lateral view of the exemplary shoe having the TPU infused mesh upper, in accordance with an embodiment of the present invention.
Figure 5:
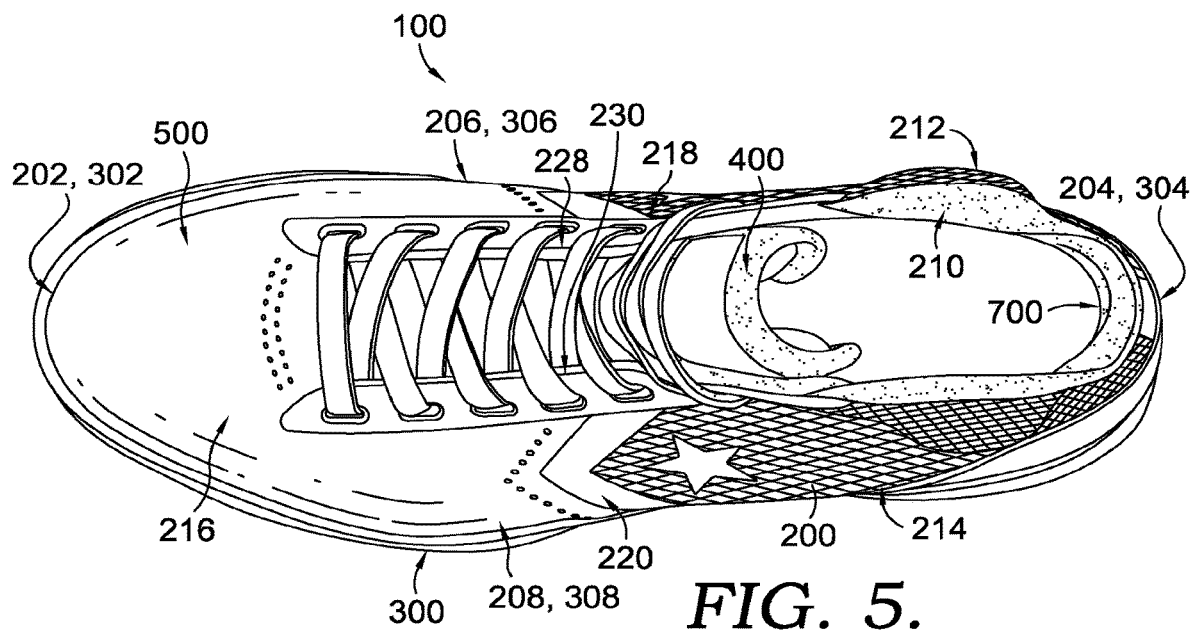
FIG. 5 depicts a top view of the exemplary shoe having the TPU infused mesh upper, in accordance with an embodiment of the present invention.

Similarly, when coupling a TPU mesh portion of the upper 200 to another portion of the upper 200, a seam reinforcement 224 may be utilized. For example, the toe portion 216 illustrated in the figures is a material other than the TPU mesh (leather, polymer, natural fibrous material, and/or the like). Conversely, the heel portion 214 is constructed from the TPU mesh. In this example, as best seen in FIGS. 1 and 2, the toe portion 216 is coupled with the heel portion 214 proximate a medial midpoint 232 and a lateral midpoint 234 near the perimeter 310. A medial junction 218 and a lateral junction 220 are formed by the coupling of the toe portion 216 and the heel portion 214. In an exemplary embodiment, the seam reinforcement 224 is applied to the TPU mesh proximate the medial junction 218 and the lateral junction 220 to reinforce the coupling of the toe portion 216 and the heel portion 214.

In an exemplary embodiment, the seam reinforcement 224 is affixed with an adhesive or welded (chemical, heat, Radio Frequency, ultrasonic) to the TPU mesh. Therefore, if a material that is conducive for stitching is intended to be coupled to the TPU mesh, the material may be stitched to the seam reinforcement 224 (individually or in addition to the TPU mesh) to couple the material and the TPU mesh. Because the TPU mesh is a mesh with a variable lattice structure, the TPU mesh may not be suitable for stitching techniques. However, it is contemplated that the TPU mesh is suitable for stitching in an exemplary embodiment.

Figure 9:
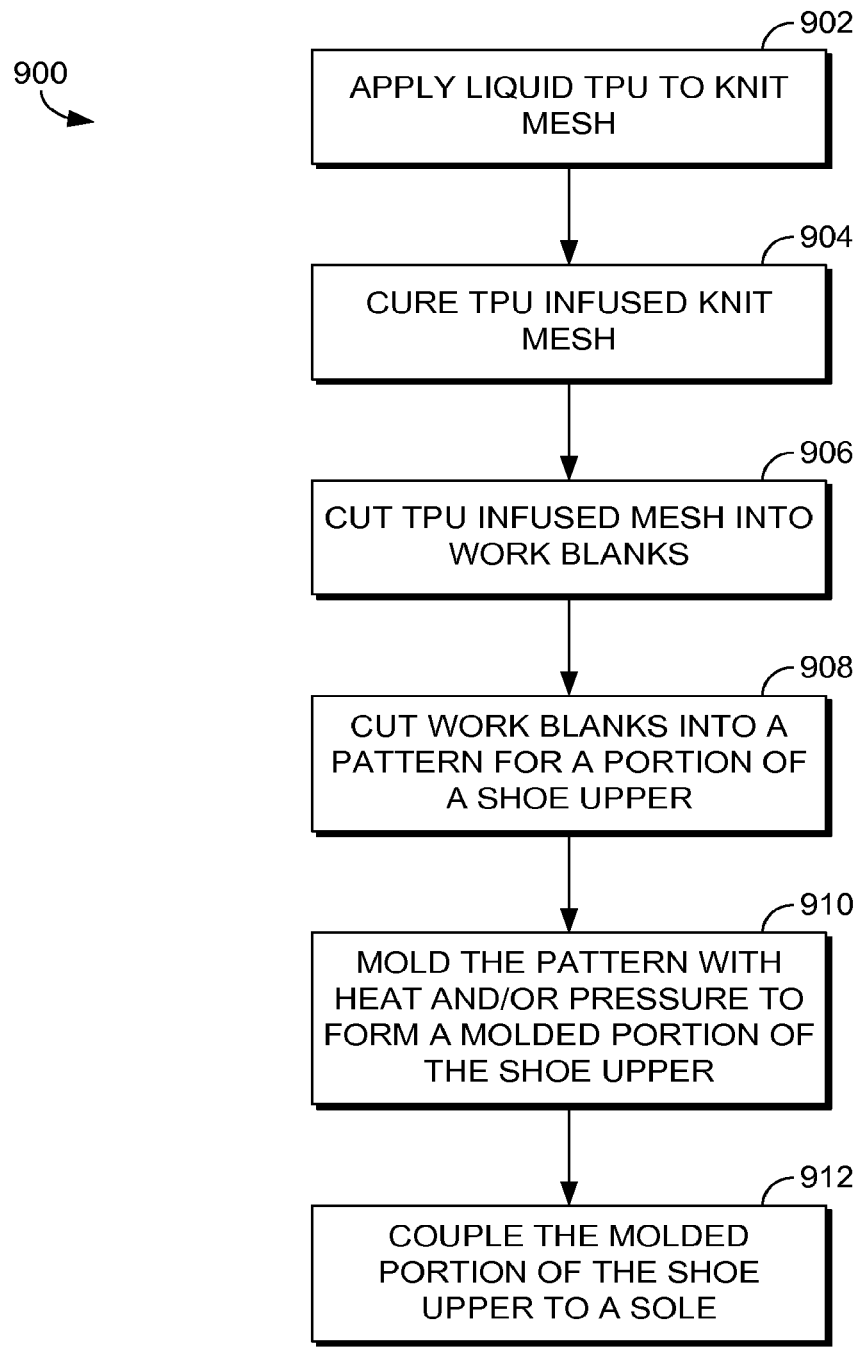
FIG. 9 depicts a diagram illustrating an exemplary method of manufacturing a shoe utilizing a TPU infused mesh, in accordance with embodiments of the present invention.

FIG. 9 depicts an exemplary method 900 for forming a shoe having a TPU mesh upper portion, in accordance with embodiments of the present invention. Formation of the TPU mesh may include, in an exemplary embodiment, applying a liquid TPU to a spacer mesh, as depicted in a block 902. In an exemplary embodiment, the TPU is in a liquid form to evenly and completely coat the various surfaces and structures of the spacer mesh. Therefore, if the TPU is in a solid pellet form, techniques known in the art may be implemented for transforming the solid TPU to a liquid TPU. For example, to achieve a liquid TPU from a pellet-based TPU, the TPU pellet may be raised to a melting temperature of the TPU. Raising the temperature of the solid TPU to its melting temperature will result in the TPU transforming to a liquid state for application to the spacer mesh. However, in an exemplary embodiment, the temperature of the TPU is maintained at a temperature that is less than a melting temperature of the spacer mesh that is intended to be infused with the liquid TPU. If the TPU temperature, as applied to the spacer mesh, exceeds the meting temperature of the spacer mesh, the spacer mesh may melt or otherwise deform in an undesirable manner.

Additional methods may be utilized to transform a solid TPU into a liquid TPU that is suitable for applying to a spacer mesh. A water dispersible TPU (water-dispersed TPU) may be utilized. In this example, the solid TPU may interact with water to form a liquid solution of TPU. In yet another exemplary embodiment, a solvent may be introduced to a solid TPU (solvent-dispersed TPU) to form a liquid TPU that is suitable for applying to a spacer mesh. Other techniques known in the art for achieving a liquid TPU are contemplated and within the scope of the present invention.

Various techniques are contemplated for applying the liquid TPU to the spacer mesh. For example, the spacer mesh may pass through a flow of liquid TPU. The spacer mesh may be submerged or pass through a TPU pool (bath). The liquid TPU may be sprayed and/or rolled onto the spacer mesh.

In an alternative exemplary embodiment, a TPU film, which is a thin sheet of TPU in a flexible film state, is applied to at least one side of a spacer mesh. The TPU film may be manipulated (e.g., heat, solvents, water) to result in the TPU film being applied to the underlying spacer mesh.

Once the TPU is applied to the spacer mesh to form the TPU infused mesh, the TPU mesh is cured, as depicted at a block 904. Curing of the TPU may be performed at room temperatures in an exemplary embodiment. In an additional aspect, it is contemplated that the TPU infused mesh is passed through an oven-like mechanism to apply heat to the TPU infused spacer mesh. It is also contemplated that a directed airflow may be applied to the TPU infused spacer mesh to effectuate a curing process of the TPU infused spacer mesh.

At a block 906, the TPU infused spacer mesh may be cut down into work blanks. For example, the TPU infused spacer mesh may be produced as a large roll of material to achieve advantages of scale when applying and/or curing the TPU infused spacer mesh. However, in an exemplary embodiment, it may be desired to reduce a bulk quantity down to manageable sizes, which are called work blanks. For example, the cured TPU infused spacer mesh may be cut down to a square meter in size. It is understood that other sizes are contemplated. The size of a work blank may be determined by a resulting pattern size to be cut. Additionally, it is contemplated that cutting the cured TPU infused spacer mesh down to work blanks may be an optional task in an exemplary embodiment of the present invention.

At a block 908, the cured TPU infused spacer mesh may be cut into a pattern. The pattern may be specific to a sole onto which the pattern is intended to be coupled. Additionally, the pattern may include one or more portions to be formed from the TPU spacer mesh. For example, a pattern may cut two or more heel portions 214 from a common work blank to reduce waste and manufacturing costs.

The pattern, in an exemplary embodiment, is molded to form a portion of an upper (e.g., the heel portion 214), as depicted at a block 910. For example, the pattern may be molded into a three-dimensional shape that is contoured to form a portion of a shoe's upper. The molding process may utilize heat and/or pressure to form the TPU infused spacer mesh into a desired form. In an exemplary embodiment, the molding process not only forms a portion but is also used to adjust a thickness of one or more location of the desired form. For example, the TPU infused spacer mesh may have a thickness of 4.5 millimeters to 5 millimeter prior to being molded, but a desired uniform thickness of 3 millimeters may be achieved by the molding process compressing the TPU infused spacer mesh. It is further contemplated that areas of a TPU spacer mesh portion may have varied thicknesses formed by the molding process depending on mechanical (or aesthetic) properties that are desired for that particular location.

At a block 912, the molded TPU mesh is coupled to a shoe sole. For example, the heel portion 214 may be coupled (as previously discussed) proximate the perimeter 310 of the sole 300 to form a portion of the upper 200 of the shoe 100. Consequently, a portion of the upper 200 is constructed of the TPU spacer mesh that is visible as part of the upper exterior surface 102.

Additional features of the shoe 100 may include a padding segment 226 (as best seen in FIGS. 1 and 2). In an exemplary embodiment, a cavity may be formed in the TPU mesh as it is molded. The cavity is adapted to receive one or more padding segments. For example, proximate a wearer's ankle, additional padding may be introduced to provide a protective barrier against contact. It is contemplated that a foam segment may be molded into/with the TPU spacer mesh during a primary molding operation to form the TPU mesh into a portion of the upper.

A bootie 700 is also contemplated with embodiments of the shoe 100. The bootie 700 may form an interior liner to receive at least a portion of a wearer's foot in an interior cavity of the shoe 100. In an exemplary embodiment, the bootie 700 is formed from an elastic-type material. The bootie 700 may be secured to the upper 200 proximate the ankle opening, proximate the medial side edge 228, proximate the lateral side edge 230, proximate an Achilles area, and/or proximate the sole 300 (e.g., a top surface of the midsole 314).

While embodiments discussed hereinabove are directed to utilizing the TPU spacer as a portion of an upper, it is contemplated that the TPU spacer mesh may also form any other portions of the shoe 100. For example, the TPU spacer mesh may form a portion of the outsole 312 and/or the midsole 314. Further, it is contemplated that the toe box 500 may be a portion of the upper 200; therefore, it is also contemplated that the toe box 500 may be formed from TPU spacer mesh.

Terms such as bonded, coupled, affixed, adhered, and the like ("coupled) are used herein to describe the temporary, semi-permanent, and/or permanent joining of two components, elements, features, etc. It is contemplated that a first portion may be coupled to a second portion using a number of techniques. For example, glues, adhesives, chemical welding, ultrasonic welding, stitching, tacking, mechanical fasteners, and the like, may be implemented in any combination.

Although the TPU mesh is described above by referring to particular embodiments, it should be understood that the modifications and variations could be made to the shoe construction described without departing from the intended scope of protection provided by the following claims. Additionally, while specific embodiments discussed herein are directed to an article of footwear, Applicants contemplate utilizing a TPU infused mesh for a variety of other purposes. For example, an exemplary embodiment may utilize TPU infused mesh in the automotive industry (e.g., seat portions), fashion industry (e.g., bags), aviation industry (e.g., structural portions), sporting equipment industry (e.g., gloves, hats, balls, padding), and similar industries and applications desiring a semi-rigid, breathable, lightweight, durable, and/or resilient material.

The invention claimed is:

1. An article of footwear constructed with thermoplastic polyurethane (TPU) infused material, comprising:
   a sole having a toe end, a heel end, a lateral side, and a medial side; and
   an upper extending upwardly from the sole and enclosing a shoe-interior cavity,
   wherein at least a portion of the upper is a TPU infused spacer mesh material having TPU infused through an exterior surface of a spacer mesh, an interior surface of the spacer mesh, and a lattice structure of the spacer mesh extending between the exterior surface of the spacer mesh and the interior surface of the spacer mesh;
   wherein the at least the portion of the upper comprising the TPU infused spacer mesh material includes a three-dimensional-shaped portion positioned on a lateral side of the upper and directly below an ankle collar, the three-dimensional-shaped portion including a portion of the exterior surface of the spacer mesh convexly protruding outwardly and away from the shoe-interior cavity, such that at least a portion of the three-dimensional-shaped portion forms a padding-receiving cavity that is positioned between the portion of the interior surface of the spacer mesh and the shoe-interior cavity;
   wherein the TPU infused spacer mesh material has a first thickness defined between the interior surface of the spacer mesh and the exterior surface of the spacer mesh in a first portion of the article of footwear, and a second thickness defined between the interior surface of the spacer mesh and the exterior surface of the spacer mesh in a second portion of the article of footwear, the second portion comprising the padding-receiving cavity and the first portion positioned adjacent to the padding-receiving cavity, wherein the first thickness is greater than the second thickness; and
   wherein a padding segment is positioned in the padding-receiving cavity between the portion of the exterior surface of the spacer mesh and the shoe-interior cavity and provides an additional amount of padding relative to portions of the TPU infused spacer mesh other than the three-dimensional-shaped portion.

2. The article of footwear of claim 1, wherein the portion of the upper that is the TPU infused spacer mesh material extends along both the medial side of the sole and the lateral side of the sole.

3. The article of footwear of claim 1, wherein the portion of the upper that is the TPU infused spacer mesh material extends around the heel end of the sole in a first direction to at least a medial midpoint along the medial side of the sole and the portion of the upper extends around the heel end of the sole in a second direction to at least a lateral midpoint along the lateral side of the sole.

4. The article of footwear of claim 1, wherein the portion of the upper that is the TPU infused spacer mesh material includes a heel portion proximate the heel end of the sole.

5. The article of footwear of claim 1, wherein the TPU infused spacer mesh material is comprised of a knit material infused with a liquid TPU, the knit material is formed from polyester, nylon, or a combination of polyester and nylon.

6. The article of footwear of claim 1, wherein the TPU infused spacer mesh material is a heat molded portion sized for the sole.

7. The article of footwear of claim 1, wherein the TPU infused spacer mesh material interior surface has a texture similar texture of the TPU infused spacer mesh material exterior surface.

8. The article of footwear of claim 1, wherein the TPU infused spacer mesh material interior surface has a different texture of the TPU infused spacer mesh material exterior surface.

9. The article of footwear of claim 1, wherein at least one of the TPU infused spacer mesh material interior surface or the TPU infused spacer mesh exterior surface material have a diamond pattern.

10. The article of footwear of claim 1, wherein the TPU infused spacer mesh material interior surface forms a pattern that is smaller than a pattern of the TPU infused spacer mesh material exterior surface.

11. The article of footwear of claim 1, wherein the TPU infused spacer mesh material interior surface forms a pattern that is larger than a pattern of the TPU infused spacer mesh material exterior surface.

12. The article of footwear of claim 1 further comprising, a second three-dimensional-shaped portion positioned on a medial side of the upper and directly below the ankle collar, wherein the second three-dimensional-shaped portion comprises:
   a second portion of the exterior surface convexly protruding outward and away from the shoe-interior cavity, such that a second padding-receiving cavity is positioned between the second portion of the exterior surface and the shoe-interior cavity; and
   a second padding segment positioned in the second padding-receiving cavity between the second portion of the exterior surface and the shoe-interior cavity, wherein the second padding segment provides an additional amount of padding relative to portions of the TPU infused spacer mesh material other than the first three-dimensional-shaped portion and the second three-dimensional shaped portion.

13. The article of footwear of claim 1, wherein the TPU infused spacer mesh material comprises a first portion of the upper and a non-TPU-mesh second material comprises a second portion of the upper; wherein a seam-reinforcement material strip is affixed to the TPU infused spacer mesh material comprising the first portion; and wherein the article of footwear further comprises stitches attaching the non-TPU-mesh second material to the seam-reinforcement material strip.

14. The article of footwear of claim 13, wherein the seam-reinforcement material strip is affixed with an adhesive or welded to the TPU infused spacer mesh material, and wherein the stitches pass through the TPU infused spacer mesh material, the non-TPU-mesh second material, and the seam-reinforcement material strip.

15. The article of footwear of claim 1, wherein the at least the portion includes a first portion and a second portion, wherein the first portion is relatively flat and uncontoured, and wherein the second portion is the three-dimensional-shaped portion including the change in the surface contour.

16. The article of footwear of claim 1, further comprising a supplemental material coupled to the upper at the TPU infused spacer mesh material and the sole.

17. The article of footwear of claim 16, wherein the TPU infused spacer mesh material has a thickness between the TPU infused spacer mesh material interior surface and the TPU infused spacer mesh material exterior surface that is less in a portion coupled with the supplemental material than in a second portion of the article of footwear.

* * * * *